March 13, 1934.  E. R. EVANS  1,950,977
ATTACHMENT OF BRAKE LINING TO BRAKE SHOE
Filed Aug. 24, 1931
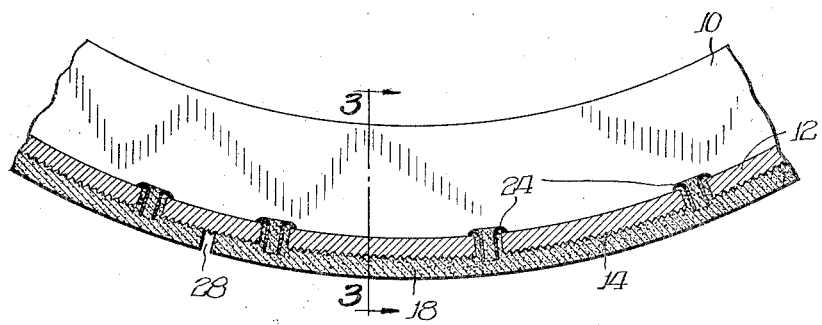
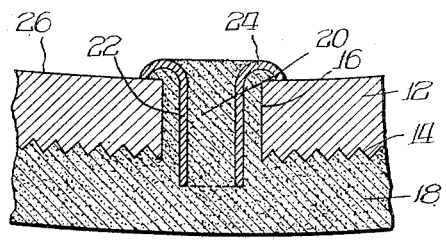
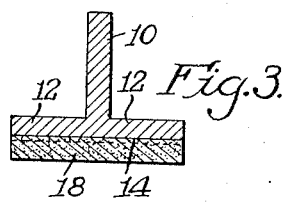
Inventor.
Edwin R. Evans, Patented Mar. 13, 1934

1,950,977

UNITED STATES PATENT OFFICE 1,950,977

ATTACHMENT OF BRAKE LINING TO BRAKE SHOE

Edwin R. Evans, Chicago, Ill.

Application August 24, 1931, Serial No. 558,917

2 Claims. (Cl. 188—234)

This invention relates to improvements in the attachment of brake linings to brake shoes and is particularly applicable to the attachment of molded brake lining to the brake shoes used in wheel brakes of motor vehicles.

This invention is a continuation in part of my application, Serial No. 265,884, filed March 30, 1928, entitled "Brake construction".

It is an object of the present invention to provide a novel manner of attaching a brake lining to a brake shoe and of preventing the breaking loose of the lining.

It is further and more specifically an object of the invention to attach a molded brake lining to a metallic brake shoe which has a corrugated or serrated surface to form a more perfect bond with the molded material of the lining.

A still further object of the invention is to mold the lining on a metallic brake shoe provided with openings into which the molded material extrudes to form in effect projections which hold the lining to the shoe and to further reinforce the said projections by supporting reinforcing members in the openings into which the molded material extrudes which reinforcing members serve to prevent breaking off of the molded projections.

Other objects and advantages of this invention will become more apparent as the description proceeds.

In the drawing:

Figure 1 is a fragmentary sectional view through a brake shoe provided with a molded lining, and Figure 2 is an enlarged detail section illustrating one of the reinforcing members.

Figure 3 is a detail section on the plane indicated 3—3 in Figure 1.

The brake shoe, generally designated 10, is preferably a segmental metallic shoe substantially T-shaped in radial cross section. The cylindrical flange 12 of the brake shoe is serrated or corrugated on its outer face, as indicated at 14, and is additionally provided with radial apertures 16 at spaced points. The brake lining 18 is formed of composition material and is molded on to the flange 12 of the brake shoe, during which molding operation, portions 20 of the lining will extrude and project into the apertures 16 to firmly lock the lining to the brake shoe. For preventing breaking off of the projections 20, suitable ferrules 22 of copper may be first positioned in the apertures 16 and the lining then molded to enclose these ferrules. As shown, the ferrules project into the molded lining somewhat beyond the outer serrated surface 14 of the brake shoe and the inner ends of the ferrules are curved as at 24 to overlap the inner surface 26 of the flange 12 of the brake shoe and form in effect rivet heads.

The molded lining is further strongly secured to the brake shoe, due to the serrated surface 14, which helps to form a more perfect bond with the molded material and prevent shifting of the lining material. The lining is preferably formed and molded in a plurality of sections, each section being spaced from an adjoining section by slots 28, whereby compensation is had for contraction and expansion of the lining incident to the use of the brake.

It will be understood therefore that the characteristic features of the present invention comprise forming the flange of the shoe with a corrugated or serrated face which may be carried out either when the shoes are originally rolled or subseqently during the forming operation after they have been cut into sections. The corrugated surface provides a larger area for surface contact with the molded lining to provide a more perfect bond. Additionally, the shoe is so formed that the molded lining material will, at certain points, extrude into the face of the shoe or the shoe could be formed in other ways so that the lining is additionally interlocked with the shoe. For example, in any desired manner, the shoe may be so formed in addition to the corrugated face that, at certain sections, the lining will be extruded to overlap portions of the shoe and prevent radial displacement of the lining from the shoe.

I claim:

1. In combination, a brake shoe formed of a T-bar, the base of the said T-bar being provided with a plurality of apertures, a lining molded on the face of said T-bar, the said lining having portions protruding through the said apertures and means for reinforcing the said protruding portions of said lining.

2. In combination, a metallic brake shoe having a cylindrical flange, a lining molded on said cylindrical flange of said shoe, said flange having apertures therethrough into which said molded lining extrudes and metallic reinforcing members inserted in said apertures.

EDWIN R. EVANS.